(12) United States Patent
Kwan et al.

(10) Patent No.: US 9,894,535 B2
(45) Date of Patent: Feb. 13, 2018

(54) PREAMBLE-BASED CHANNEL RESERVATION AND SELF-ORGANIZED FAIRNESS MECHANISMS FOR LONG TERM EVOLUTION (LTE) OVER SHARED SPECTRUM

(71) Applicant: Cisco Technology, Inc., San Jose, CA (US)

(72) Inventors: Raymond Yuk Chor Kwan, Swindon (GB); Peter Keevill, Bath (GB); James Paul Seymour, Long Grove, IL (US); Rajesh Pazhyannur, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 93 days.

(21) Appl. No.: 15/147,290

(22) Filed: May 5, 2016

(65) Prior Publication Data

US 2017/0325098 A1 Nov. 9, 2017

(51) Int. Cl.
| | |
|---|---|
| *H04W 16/14* | (2009.01) |
| *H04W 72/04* | (2009.01) |
| *H04W 24/02* | (2009.01) |
| *H04W 72/08* | (2009.01) |
| *H04W 56/00* | (2009.01) |

(52) U.S. Cl.
CPC .......... *H04W 16/14* (2013.01); *H04W 24/02* (2013.01); *H04W 56/001* (2013.01); *H04W 72/0446* (2013.01); *H04W 72/085* (2013.01)

(58) Field of Classification Search
CPC .... H04W 16/14; H04W 24/02; H04W 56/001
See application file for complete search history.

(56) References Cited

U.S. PATENT DOCUMENTS

2016/0088642 A1* 3/2016 Yang ................... H04W 24/08
455/451

OTHER PUBLICATIONS

"Simulation results for Downlink Coexistence of LAA and Wi-Fi" Cisco Systems, Agenda item 2.1, 3GPP TSG RAN WG1 #80 LAA ad-hoc, Mar. 24-26, 2015, Paris, France, R1-151058, 20 pages.
"Simulation results for Coexistence of LAA and Wi-Fi", Cisco Systems, Agenda item 7.2.3.1, 3GPP TSG RAN WG1 #80, Feb. 9-13, 2015, Athens, Greece, R1-150134, 13 pages.

(Continued)

*Primary Examiner* — Siming Liu
(74) *Attorney, Agent, or Firm* — Edell, Shapiro & Finnan, LLC (57) ABSTRACT

A wireless device accesses a shared spectrum equitably in a self-organizing manner by determining success indices and adjusting courtesy parameters. The wireless device transmits wireless transmissions in a frame subframe structure over a shared spectrum, each of the subframes bounded by subframe boundaries at predetermined time intervals. The success index represents a measure of success in transmitting wireless transmissions in the shared spectrum. The wireless device performs a clear channel assessment to determine whether the shared spectrum is available at the end of the clear channel assessment time interval. The wireless device determines a gap interval between the end of the clear channel assessment time interval and the next subframe boundary and transmits the success index during the gap interval.

20 Claims, 8 Drawing Sheets

(56) References Cited

OTHER PUBLICATIONS

"Proposal for achieving fair coexistence between LAA and Wi-Fi", Cisco Systems, CableLabs, Broadcom, Agenda item 7.2.3.4, 3GPP TSG RAN WG1 #80, Feb. 9-13, 2015, Athens, Greece, R1-150549, 5 pages.

"WF on LAA functionalities", 3GPP TSG RAN WG1 Meeting #79, San Francisco, USA, Nov. 17-21, 2014, AI: 6.3.2.2, R1-145379, 4 pages.

* cited by examiner

PREAMBLE-BASED CHANNEL RESERVATION AND SELF-ORGANIZED FAIRNESS MECHANISMS FOR LONG TERM EVOLUTION (LTE) OVER SHARED SPECTRUM

TECHNICAL FIELD

The present disclosure relates to wireless networks.

BACKGROUND

Wi-Fi® equipment and Licensed-Assisted Access (LAA) of the Long Term Evolution (LTE) wireless standard are expected to share the same spectrum (5 GHz for example). To ensure fair co-existence in the same channel, LAA-LTE is expected to deploy some form of Listen-Before-Talk (LBT) and back-off mechanisms. Due to differences in defer and back-off mechanisms between LAA-LTE and Wi-Fi, there are challenges in defining a single unified rule in maintaining a fair co-existence without careful selection of fairness parameters.

Some LBT mechanisms may be required in certain regulatory domains (like the European Telecommunications Standards Institute (ETSI), for instance). The sensing mechanism required is "energy-detect" in the operating channel. For example, Wi-Fi implements Clear Channel Assessment Energy Detect (CCA-ED) to detect non Wi-Fi sources in the operating channel. This threshold typically set to −62 dBm/20 MHz.

Third Generation Partnership Project (3GPP) Release-13 LAA-LTE defines something similar to CCA-ED. However, in many deployment scenarios this will not be enough to avoid collisions between Wi-Fi and LAA-LTE. A Wi-Fi device and LTE device implementing LAA may not be able to detect each other based on energy detect thresholds, but a Wi-Fi receiver may indeed be interfered with by a LAA-LTE transmitter and vice versa. Specifically, if a Wi-Fi device and an LAA-LTE device were to transmit at the same time, there will be incidents of packet collisions. This is more likely to happen between Wi-Fi and LAA-LTE devices than between two different Wi-Fi devices because preamble detection will likely only be implemented between two Wi-Fi devices.

Additionally, LAA-LTE subframes in the unlicensed band, e.g., the shared spectrum, are likely to be aligned with the subframes in the licensed band. Further, the wireless transmission in the shared spectrum is likely to be forced to begin at the start of an LTE subframe. However, an idle medium may occur at any part of a subframe, and a requirement to begin the LAA-LTE transmission only at the beginning of the LTE subframe may cause the medium to remain idle for longer than necessary, wasting resources.

DESCRIPTION OF EXAMPLE EMBODIMENTS

Overview

Methods are presented herein for self-organizing fair access to a shared spectrum by a wireless system. The method comprises, at a wireless device, determining a success index representing a measure of success in transmitting wireless transmissions in a shared spectrum. The wireless device is configured to transmit wireless transmissions in a plurality of subframes over a shared spectrum, each of the subframes bounded by subframe boundaries at predetermined time intervals. The wireless device performs a clear channel assessment to determine whether the shared spectrum is available at the end of the clear channel assessment time interval. The wireless device determines a gap interval between the end of the clear channel assessment time interval and the next subframe boundary and transmits the success index during the gap interval.

DETAILED DESCRIPTION

Due to the unpredictability of the availability of the shared spectrum, and the consideration that pre-existing subframe timing of LTE subframes is to be respected, there exists a random temporal gap (i.e., a partial subframe) between the time a channel becomes available and the next subframe. This random temporal gap is uniformly distributed between zero milliseconds and one millisecond. As this partial subframe is of a duration less than one millisecond, it is generally not aligned with the existing LTE frame structure.

Some proposals for utilizing this gap period have been proposed, including control signals (e.g., channel reservation, Primary Synchronization Signal (PSS), Secondary Synchronization Signal (SSS), signals related to time/frequency synchronization, support for user equipment Automatic Gain Control and cell identification, etc.). The partial subframe may also include data transmission as well. The techniques presented herein expand on the use of this gap period by including a mechanism to allow messages to be exchanged dynamically in order to facilitate fair coexistence in a self-organizing manner. Some simulation results have shown that it is possible to achieve a good level of fairness based on an optimal set of parameters (i.e., courtesy parameters), which is relatively insensitive to the traffic load. However, such an optimal setting may be sensitive to specific deployment scenarios, and in real-life deployments, some form of self-organizing mechanism may prove useful.

Figure 1:
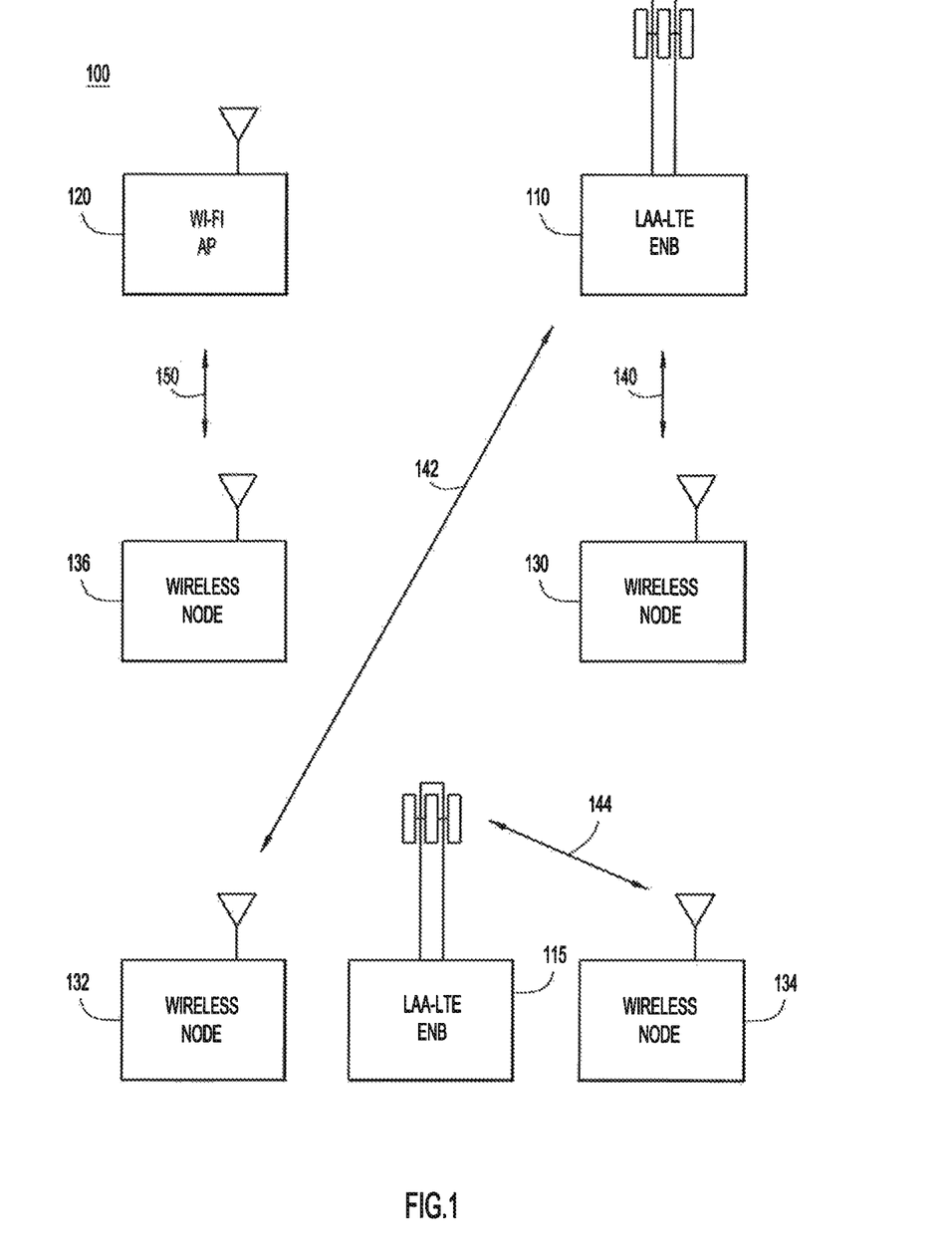
FIG. 1 is a system block diagram illustrating a wireless transmission system configured to use the fairness logic to maintain an equitable sharing of an unlicensed spectrum between LAA-LTE and Wi-Fi systems, according to an example embodiment.

Referring now to FIG. 1, a system block diagram illustrates examples of scenarios in which the methods presented herein are useful. LAA-LTE devices 110 and 115, such as evolved nodes B (eNBs), and a Wi-Fi access point 120 communicate with wireless nodes 130, 132, 134, and 136. In one example, one or more of the wireless nodes 130, 132, 134, and 136 may be capable of communicating across multiple technologies. LAA-LTE eNB 110 sends and receives communications 140 with wireless node 130 and communications 142 with wireless node 132. LAA-LTE eNB 115 sends and receives communications 144 with wireless node 134. Wi-Fi access point 120 sends and receives Wi-Fi communications 150 with wireless node 136. Communications 140, 142, and 144 may occur over frequencies exclusive to the operator of the LTE network (e.g., licensed frequencies) and/or shared (e.g., unlicensed) frequencies. Wi-Fi communications 150 occur over shared frequencies. The LAA-LTE devices 110 and 115, the Wi-Fi access point 120, and the wireless nodes 130, 132, 134, and 136 are all in sufficient proximity that there may be interference between signals transmitted over the shared frequencies.

In one example, the wireless communications 140, 142, and 144 are formatted in accordance with an LAA-LTE frame/subframe structure and are transmitted over unlicensed spectrum. If the wireless communications are broadcast over shared frequencies, a contention process may be used to determine the timing of the transmissions such that only one transmitter is active at a given time. The techniques presented herein provide for including information in the wireless transmissions that can be used by some or all of the wireless transmitters to improve the contention process. In one example, the wireless transmissions may include a success index associated with the transmitting device. The success index may be transmitted, along with control signals and/or user data, in the partial subframe between the transmitting device determining that the medium is free and the subframe boundary starting the next full subframe.

In another example, one or more legacy wireless devices (e.g., Wi-Fi access point 120) may not have the capability to directly transmit its success index to the nearby wireless devices. In this case, the other devices (e.g., LAA-LTE eNB 110) may estimate a success index for the legacy node based on legacy transmission protocols. For example, LAA-LTE eNB 110 may estimate a success index for Wi-Fi access point 120 by measuring the number of Request-To-Send (RTS)/Clear-To-Send (CTS) messages sent by Wi-Fi nodes. Other channel reservation messages, such as CTS-To-Self messages, may also be used to estimate the success index of the Wi-Fi nodes. Together with the channel reservation duration requests from the Wi-Fi nodes, the LAA-LTE eNB 110 would have sufficient information to estimate the level of traffic load required by the Wi-Fi nodes. In this case, the success index for a legacy Wi-Fi node would be a function of RTS/CTS (or CTS-To-Self) counts and channel reservation durations obtained during standard channel sensing.

Figure 2:
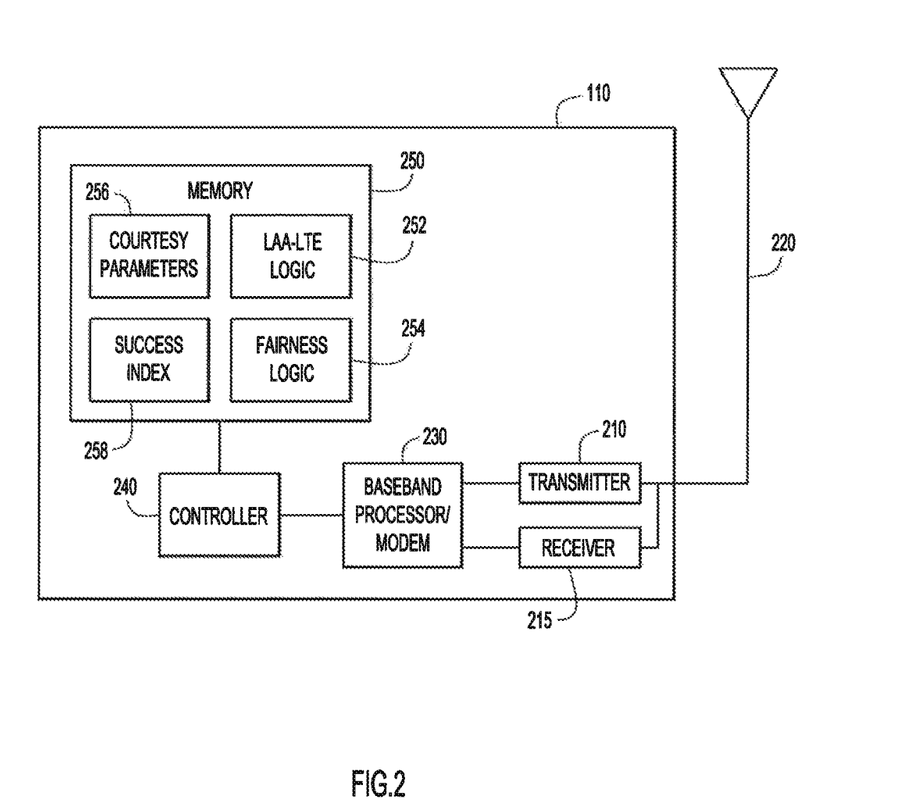
FIG. 2 is a simplified block diagram of a LTE device that may be configured to perform the methods presented herein, according to an example embodiment.

Referring now to FIG. 2, a simplified block diagram illustrates a wireless device, e.g., LAA-LTE eNB 110, configured to perform the methods presented herein. The LAA-LTE eNB 110 is shown as an example of a wireless device, but other wireless devices (e.g., wireless node 130) may include similar components that perform similar methods. The wireless device 110 includes a transmitter 210 (or multiple transmitters), a receiver 215 (or multiple receivers), an antenna 220, a baseband processor 230 (e.g., a modem), and a controller 240 (e.g., a processor such as a microprocessor or microcontroller). The receiver 215 may comprise one or more receivers with the capability to detect signals according to a plurality of formats, e.g., Wi-Fi and LAA-LTE signals. The baseband processor 230 may perform media access control (MAC) functions as well as physical layer (PHY) functions. The methods presented herein may be implemented by control logic in the baseband processor 230. The control logic may take the form of fixed or programmable digital logic gates. In another form, the control logic may be implemented by instructions stored/encoded in memory 250 (e.g., LAA-LTE logic 252, fairness logic 254) and executed by the controller 240. The memory 250 may also store data (e.g., courtesy parameters 256, success index 258, etc.) related to the control logic. Additionally, the wireless device 110 may include a wired network interface unit (not shown) to communicate with other computing devices over a wired network.

The memory 250 may include read only memory (ROM), random access memory (RAM), magnetic disk storage media devices, optical storage media devices, flash memory devices, electrical, optical, or other physical/tangible memory storage devices. Thus, in general, the memory 250 may comprise one or more tangible (non-transitory) computer readable storage media (e.g., a memory device) encoded with software comprising computer executable instructions and when the software is executed (by the controller 240) it is operable to perform the operations described herein.

Figure 3A:
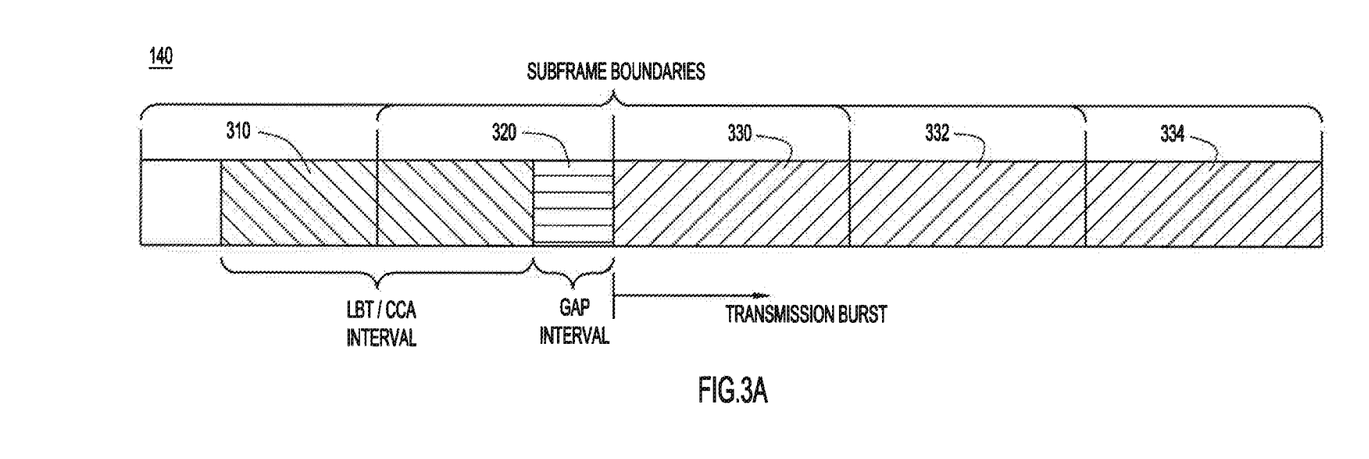
FIG. 3A illustrates a wireless transmission transmitting synchronization signal(s) in the gap interval between detecting a medium idle and the next subframe boundary in accordance with a method presented herein.

Referring now to FIG. 3A, one example of a wireless transmission 140 transmitted by wireless device 110 is shown in the context of the frame/subframe structure. Wireless transmission 140 originating from wireless device 110 is used as an example, but other transmissions from other wireless devices may follow a similar procedure as shown in FIG. 3A. Prior to transmitting in the shared spectrum, the wireless device 110 contends for the shared spectrum with a Listen Before Talk (LBT)/Clear Channel Assessment (CCA) procedure. At the end of an LBT/CCA interval 310 during which the LBT/CCA procedure is running, the wireless device 110 has priority over the shared spectrum and may begin transmitting without expecting interference from other wireless devices. However, since the LBT/CCA interval 310 ends at a randomly determined point that will not generally align with a subframe boundary, a gap interval exists in which the wireless device 110 has access to the shared spectrum, but cannot transmit user data using a standard LTE subframe structure.

In order to fully utilize the shared spectrum, the wireless device 110 may begin transmitting control signals 320 (e.g., synchronization signals, automatic gain control information, channel reservation, channel estimation information, cell identification, etc.) during the gap interval. The control signals 320 may include a success index that is related to the success of the wireless device 110 in gaining access to the shared spectrum. In one example, the success index may be related to a ratio between the mean served cell throughput to the mean offered cell load based on a certain data arrival rate collected over a predetermined measurement interval of time. In another example, the success index may be related to a buffer occupancy, i.e., the percentage of time that the wireless device 110 has data to transmit, including retransmissions.

At the subframe boundary at the end of the gap interval, the wireless device 110 begins a transmission burst of user data in typical LTE subframes 330, 332, and 334. Only three subframes are shown in FIG. 3A, but the transmission burst may include subsequent subframes that are not shown. At the completion of the transmission burst, any wireless devices with data to transmit may enter the contention process for the shared spectrum again.

The other wireless devices, e.g., wireless nodes 130, 132, 134, 136, and/or eNB 115, may detect the success index that is transmitted along with the control signals 320, and adjust one or more parameters (e.g., courtesy parameters) to allow the wireless device more or less access to the shared spectrum in subsequent contention processes. Each wireless device receives success indices from the other wireless devices, allowing the system to self-organize into a fair coexistence between neighboring wireless transmitters.

In one example, an LAA-LTE eNB may include parameters such as a CCA slot duration, an extended CCA (ECCA) slot duration, an exponential back-off rate, a maximum length of a transmission burst, and/or an energy sensing threshold. Each of these parameters affects the ability of an LAA-LTE transmitter to contend for shared spectrum. For example, if the energy sensing threshold is lowered, then the LAA-LTE eNB would be more conservative in channel sensing, and the chance of gaining access to the shared spectrum is reduced. This gives rise to a direct trade-off between LAA-LTE and Wi-Fi network performance.

In another example, Wi-Fi access points and client devices may include parameters such as, but not limited to, a defer period similar to an offset to the Distributed Coordination Function (DCF) InterFrame Space (DIFS) or a similar concept as an Arbitrary InterFrame Space (AIFS), a minimum or maximum contention window size, back-off parameters, and/or a maximum duration of a Protocol Data Unit (PDU).

Figure 3B:
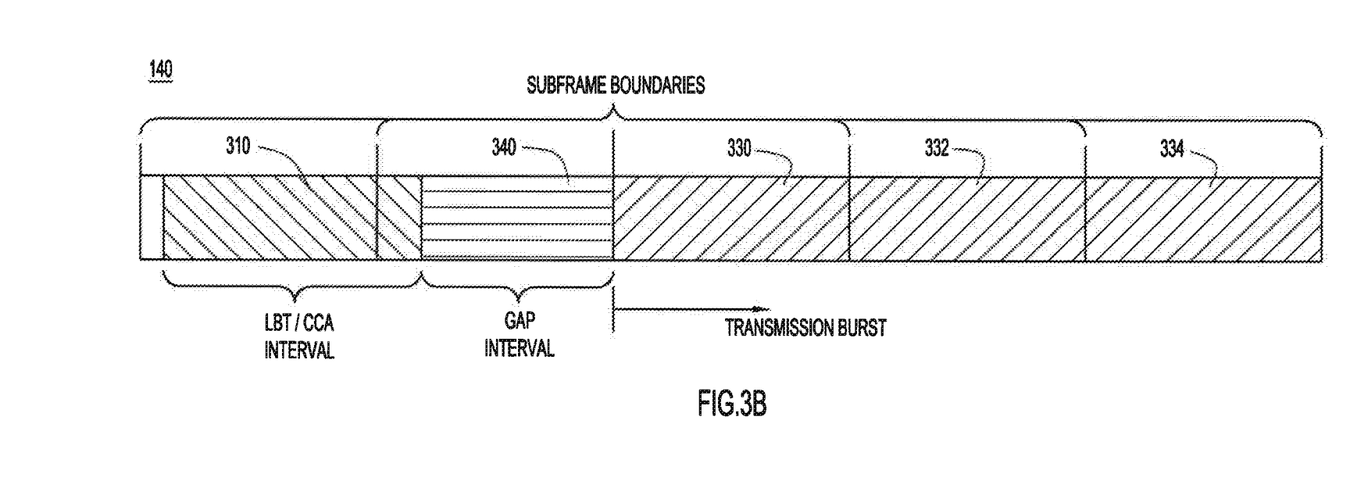
FIG. 3B illustrates a wireless transmission transmitting synchronization signal(s) and control signal(s) in a larger gap interval between detecting a medium idle and the next subframe boundary in accordance with a method presented herein.

Referring now to FIG. 3B, another example of a wireless transmission 140 transmitted by wireless device 110 is shown in the context of the frame/subframe structure. Wireless transmission 140 originating from wireless device 110 is used as an example, but other transmissions from other wireless devices may follow a similar procedure as shown in FIG. 3B. In this example, the LBT/CCA interval 310 ends relatively earlier in the frame/subframe structure, allowing for a longer gap interval before the transmission burst starts with subframes 330, 332, and 334. Since the gap interval in longer, the wireless device 110 may have more resources available than the control signals occupy. If the gap interval is greater than a predetermined size, then the wireless device 110 may transmit user data in the partial subframe 340, along with the control signals and the success index.

The user data from wireless device 110 may comprise Physical Downlink Control Channel (PDDCH) and Physical Downlink Shared Channel (PDSCH) data in the partial subframe 340. The inclusion of user data allows for a more efficient use of the gap interval. If the gap interval is relatively large, it may be reasonable to more efficiently utilize the space even though a partial subframe is available. On the other hand, if the gap interval is relatively short, only the control signals are included. In this case, the overhead signaling/data from the PDDCH/PDSCH can be avoided, and the available gap interval resources can all be allocated to the control signals.

Figure 4:
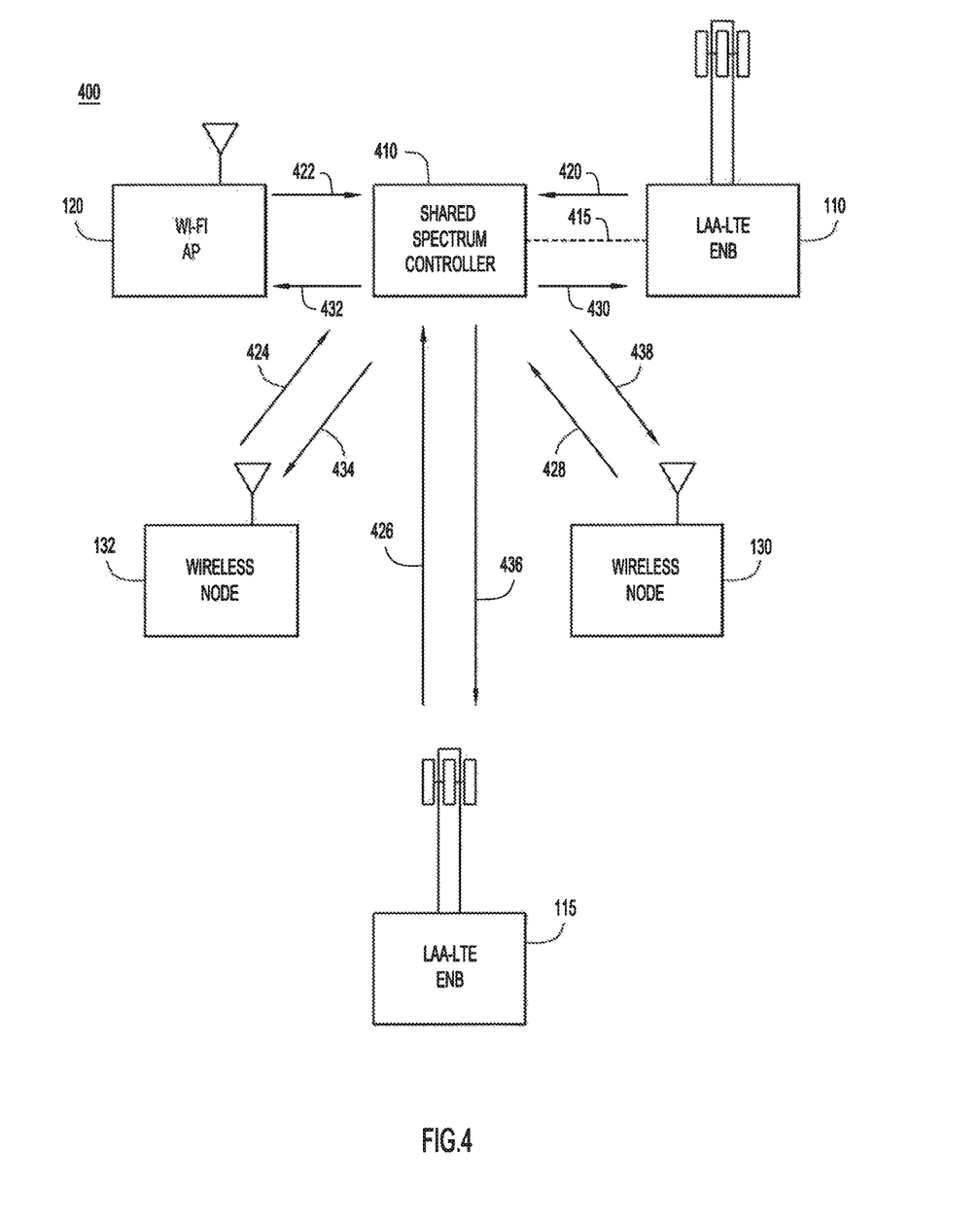
FIG. 4 illustrates a wireless transmission system with a central controller coordinating the equitable sharing of the unlicensed spectrum, according to an example embodiment.

Referring now to FIG. 4, a wireless system 400 is shown as an example in which access to the shared spectrum is centrally controlled. A centralized controller 410 monitors the shared spectrum and coordinates access to the medium by each of the nearby wireless devices. In one example, the controller 410 is connected to LAA-LTE eNB 110 through connection 415 and uses the wireless hardware (e.g., antenna, receiver, transmitter, etc.) from the eNB 110 to monitor the shared spectrum. Alternatively, the controller 410 may include its own wireless hardware to monitor the shared spectrum and communicate with the other wireless devices.

To coordinate access to the shared spectrum, the controller 410 collects data 420 from LAA-LTE eNB 110, data 422 from Wi-Fi access point 120, data 424 from wireless node 132, data 426 from LAA-LTE eNB 115, and data 428 from wireless node 130. In one example, the data may include a success index computed by each individual wireless device. Alternatively, the controller 410 may calculate a success index for each wireless device based on the data received from the wireless devices.

After determining a fair and equitable sharing arrangement for the shared spectrum, the controller 410 sends a message 430 to LAA-LTE eNB 110 with any adjustments in the courtesy parameters that need to be made. Similarly, the controller 410 may adjust the parameters of access point 120, wireless node 132, LAA-LTE eNB 115, and wireless node 130 with messages 432, 434, 436, and 438, respectively. The controller 410 may periodically reassess the fairness of the shared spectrum and further adjust the parameters based on updated data received from the wireless devices.

Figure 5:
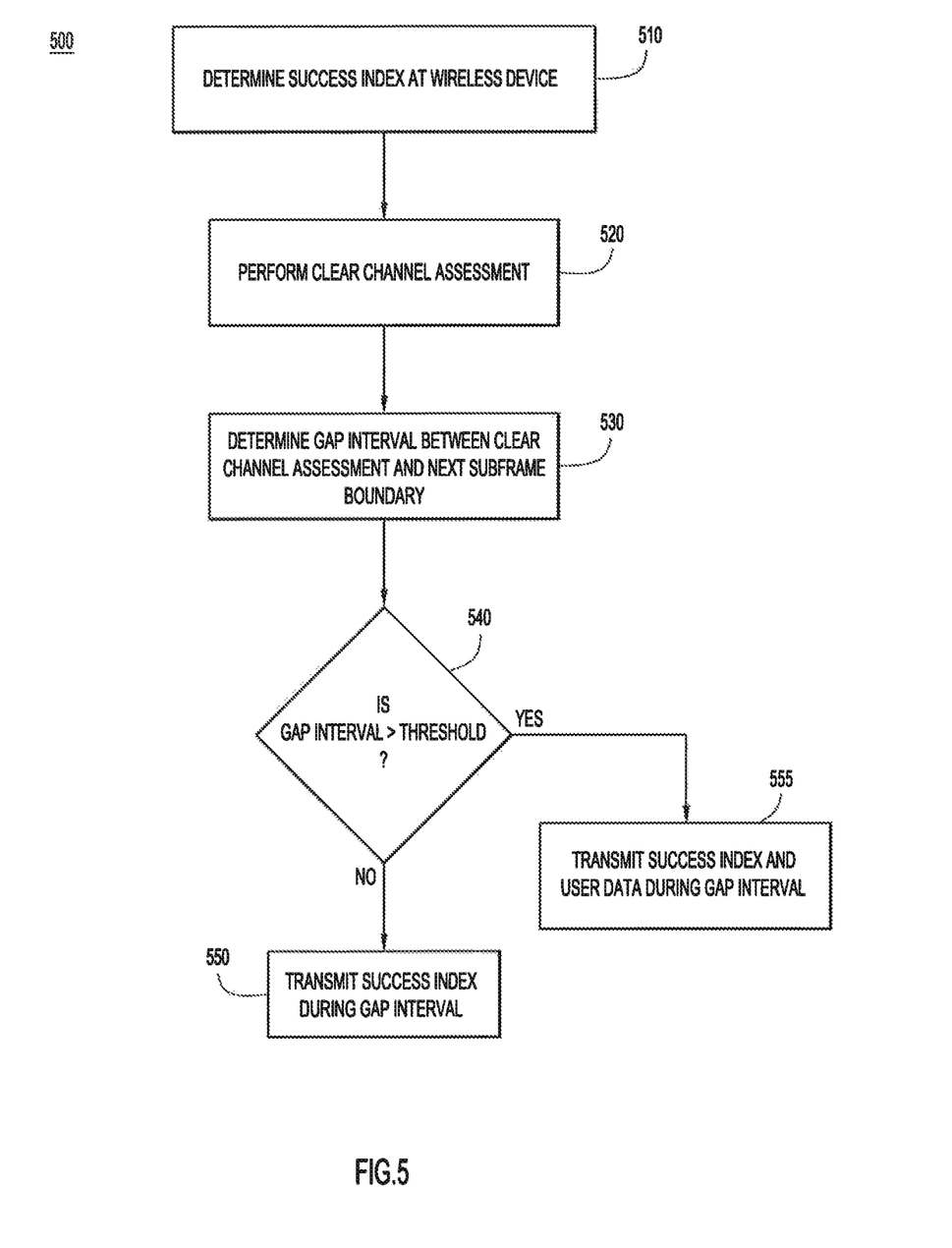
FIG. 5 is a flowchart illustrating operations of a wireless device in transmitting a success index to ensure other transmitters share the unlicensed spectrum fairly, according to an example embodiment.

Referring now to FIG. 5, a flowchart illustrates operations performed by a wireless device (e.g., LAA-LTE eNB 110) in a process 500 to self-organize access to a shared spectrum in a fair manner. In step 510, the wireless device determines a success index that represents the success that the wireless device has had in gaining access to the shared spectrum. In one example, the success index may be based on the amount of time the wireless device spends transmitting in comparison to the amount of time the wireless device has data to transmit. In another example, the success index may reflect a number of times that the wireless device gains access to the shared spectrum in comparison to the number of times the wireless device is forced to defer access. In general, the success index will increase as the wireless device gains access to transmit data in the shared spectrum, and will decrease as the wireless device is denied access to transmit data in the shared spectrum.

In step 520, the wireless device performs a Clear Channel Assessment (CCA) in a Listen Before Talk procedure to determine whether there is currently another device transmitting in the shared spectrum. In one example, the CCA lasts for a random interval of time, and at the end of the CCA interval the wireless device determines that the shared spectrum is free for the wireless device to transmit data. Since the end of the CCA interval is randomly placed within the frame subframe structure, in step 530, the wireless device determines a gap interval between the end of the CCA interval and the next scheduled subframe boundary. The gap interval covers a fraction of a partial subframe, which is used to transmit the success index.

If the gap interval is shorter than a predetermined threshold length, as determined in step 540, then the wireless device transmits the success index during the gap interval in step 550. The wireless device may also transmit some control signals that assist in setting up the channel for transmission of user data in subsequent subframes. If the gap interval is longer than the predetermined threshold length, as determined in step 540, then the wireless device transmits the success index along with the control signals and user data during the gap interval in step 555. The longer gap interval allows the wireless device to include user data as well as the success index and control signals, so that the shared spectrum is used more efficiently. When the gap interval is shorter and fewer resource blocks are available in the partial subframe, the wireless device focuses on transmitting the success index and control signals in preparation for sending the user data in the full subframes after the partial subframe.

Figure 6:
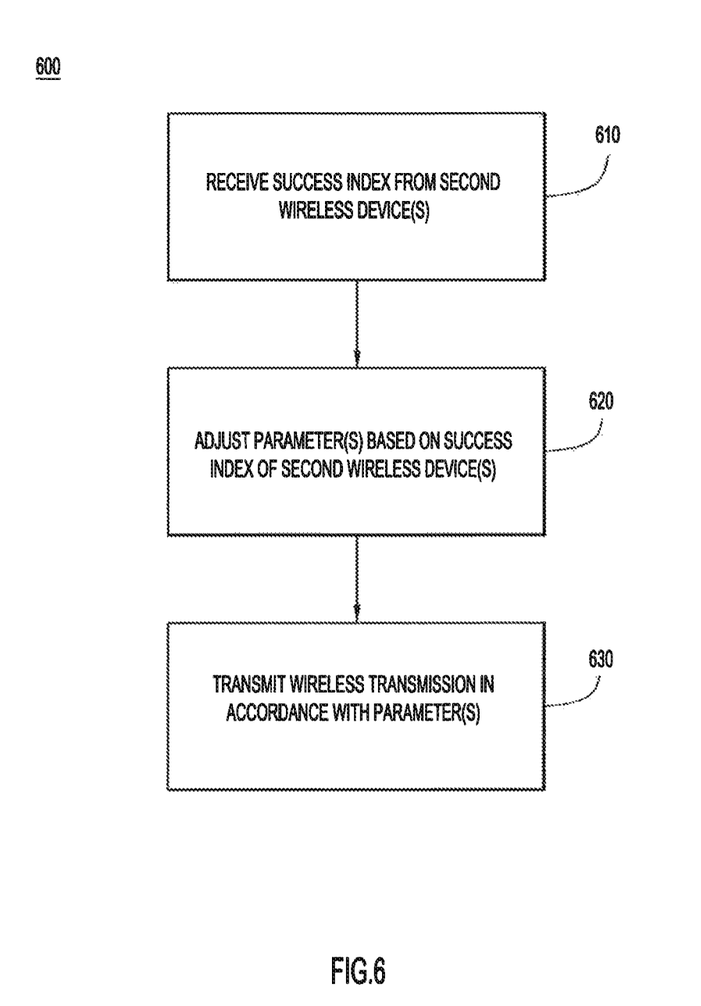
FIG. 6 is a flowchart illustrating operations of a wireless device in receiving success indices from other wireless devices to share the unlicensed spectrum fairly, according to an example embodiment.

Referring now to FIG. 6, a flowchart illustrates operations performed by a first wireless device in a process 600 of adapting its parameters to allow all of the nearby wireless devices access to the shared spectrum in a fair manner. In step 610, the first wireless device receives a success index corresponding to one or more second wireless device. In one example, success indices of the second wireless devices may be received over a relatively long period of time in which multiple wireless devices have had the opportunity to transmit data along with the success index associated with the respective second wireless device. Each of the second wireless devices may transmit their respective success index in the gap interval between their CCA interval and the next subframe boundary. In another example, the success index for the second wireless device may be received from a centralized controller.

In step 620, the first wireless device adjusts one or more parameters (e.g., courtesy parameters) based on the success index of the second wireless device. In one example, the first wireless device adjusts parameters to make the first wireless device more (or less) aggressive in asserting access to the shared spectrum when the success index of the second wireless device is higher (or lower) than a success index computed for the first wireless device. In step 630, the first wireless device transmits a wireless transmission over the shared spectrum in accordance with the adjusted parameters. In one example, the adjusted parameters may result in the first wireless device deferring to one of the second wireless devices before transmitting its own wireless transmission.

Figure 7:
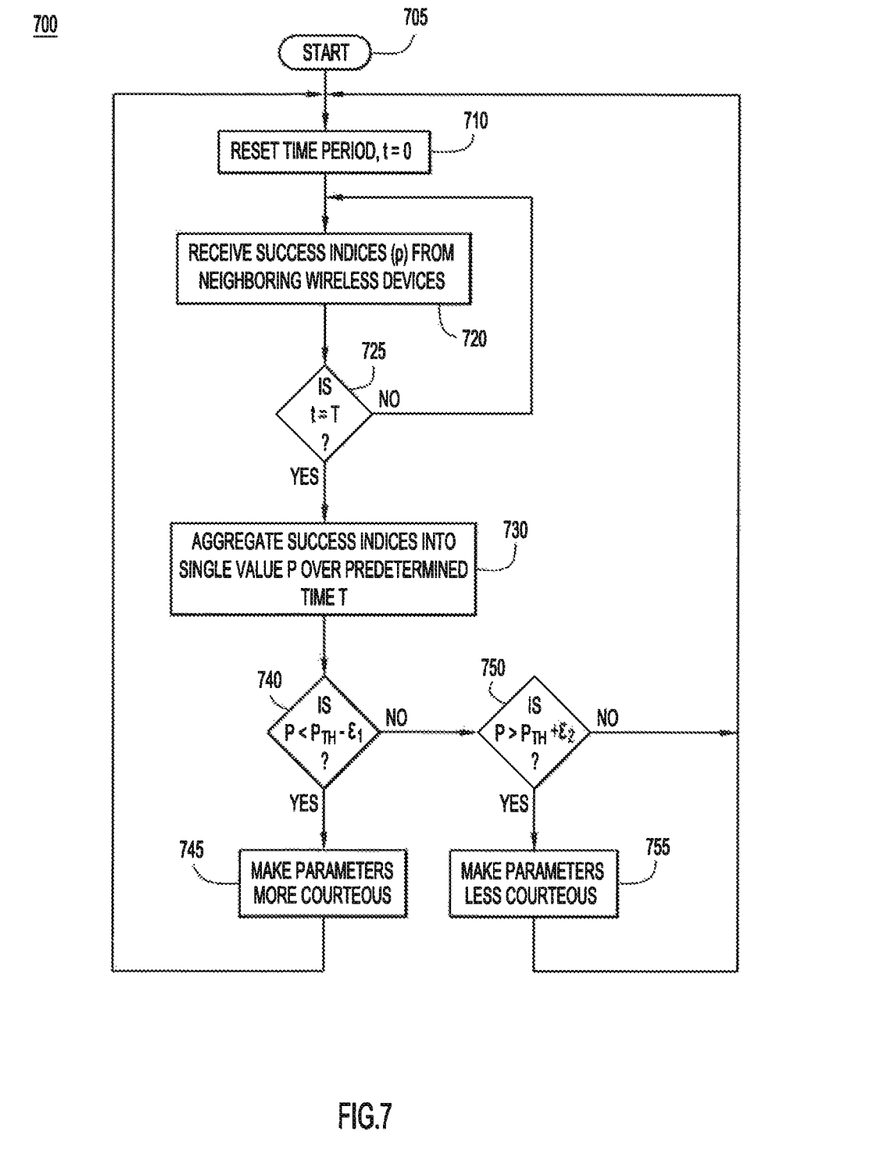
FIG. 7 is a flowchart illustrating operations of a wireless device in adjusting parameters in response neighbors' broadcast success indices over a predetermined time to share the unlicensed spectrum fairly, according to an example embodiment.

Referring now to FIG. 7, a flowchart illustrates operations performed by a wireless device in adapting its parameters to allow all of the nearby wireless devices access to the shared spectrum in a fair manner according to another process 700. The process 700 starts at 705 and the wireless device resets a measurement time period (t=0) in step 710. For a predetermined amount of time (T), the wireless device receives success indices (p) from neighboring wireless devices in step 720. In one example, the success index p can take on values between 0 and 1, with 0 being the least successful and 1 being completely successful. The wireless device accumulates the success indices of neighboring wireless devices until the time period equals the predetermined measurement time (t=T), as determined in step 725.

After the measurement time period T, in step 730, the wireless device aggregates the success indices received during the time period T to generate an aggregate success index (P) of the nearby wireless devices. If the aggregate success index P is lower than a threshold ($P_{TH}$) by at least a certain tolerance ($\epsilon_1$), as determined in step 740, then the wireless device adjusts its parameters to make the wireless device more courteous toward the nearby wireless devices. Similarly, if the aggregate success index P is greater than the threshold $P_{TH}$ by at least a certain tolerance ($\epsilon_2$), as determined in step 750, then the wireless device adjusts its parameters to make the wireless device less courteous toward the nearby wireless devices. If the aggregate success index P is within the tolerances $\epsilon_1$ and $\epsilon_2$ of the threshold $P_{TH}$, then the wireless device returns to the beginning of the process 700 and resets the timer for a new measurement period.

In one example, the wireless device makes itself more courteous by increasing an exponential back-off rate in order to make the wireless device less aggressive in its seeking access to the shared spectrum. In another example, the wireless device may make itself more courteous by increasing the duration of the CCA interval or decreasing an energy sensing threshold for the CCA process. On the other hand, examples of making the wireless device less courteous include decreasing the exponential back-off rate, decreasing the CCA interval duration, and/or increasing the energy threshold.

In a further example, the threshold $P_{TH}$ that is compared to the aggregate success index P may be a success index calculated for the wireless device itself. This will result in a relative comparison in which the wireless device will become more aggressive if its success index is below the aggregate value and less aggressive if its success index is above the aggregate value.

Figure 8:
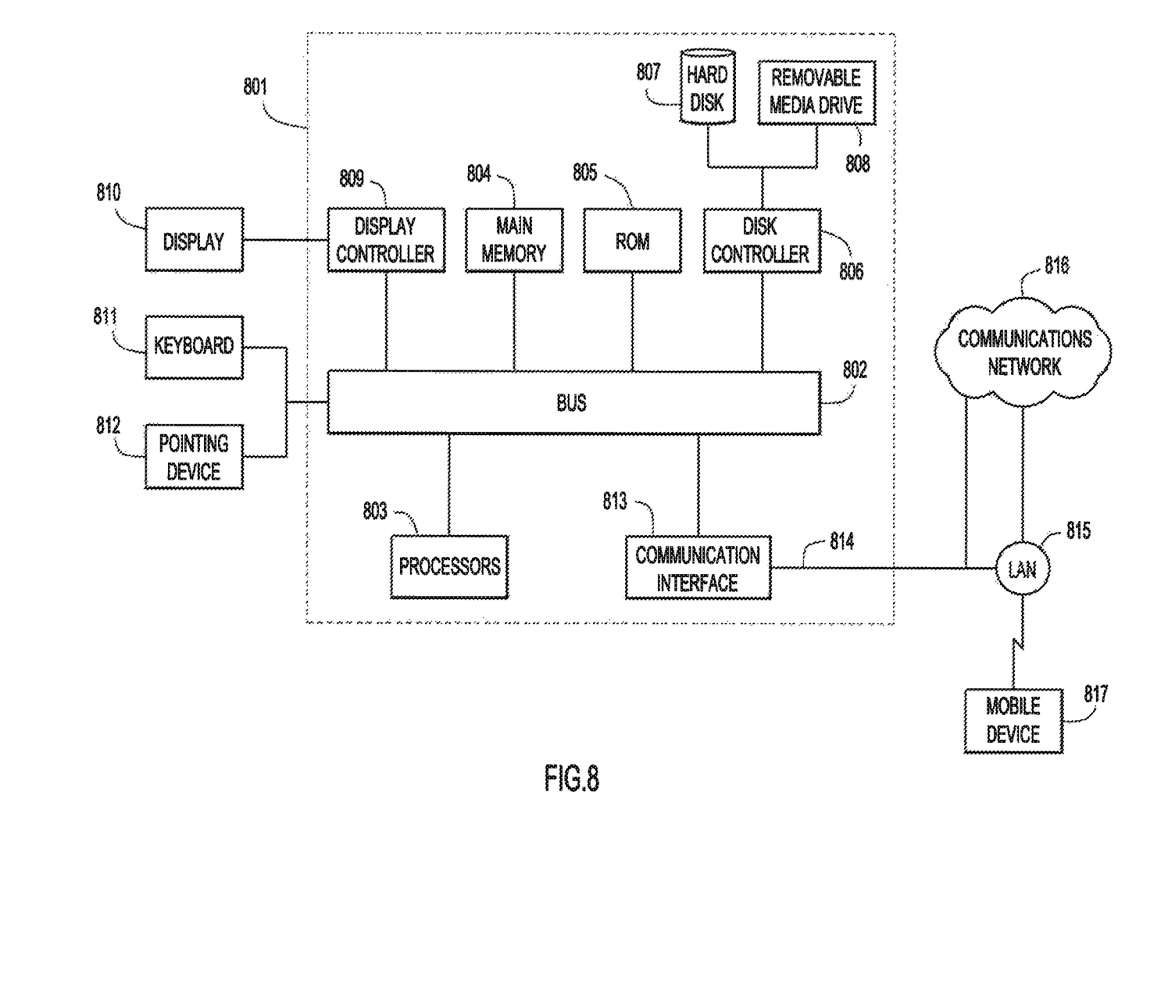
FIG. 8 illustrates a simplified block diagram of a computer system configured to perform the methods presented herein, according to an example embodiment.

FIG. 8 illustrates a computer system 801 upon which the embodiments presented may be implemented. The computer system 801 may be programmed to implement a computer based device, such as a video conferencing endpoint or any device includes a video encoder or decoder for processing real time video images. The computer system 801 includes a bus 802 or other communication mechanism for communicating information, and a processor 803 coupled with the bus 802 for processing the information. While the figure shows a single block 803 for a processor, it should be understood that the processors 803 may represent a plurality of processing cores, each of which can perform separate processing. The computer system 801 also includes a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803.

The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive, solid state drive, etc.). The storage devices may be added to the computer system 801 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 801 may also include a display controller 809 coupled to the bus 802 to control a display 810, such as a cathode ray tube (CRT), liquid crystal display (LCD) or light emitting diode (LED) display, for displaying information to a computer user. The computer system 801 includes input devices, such as a keyboard 811 and a pointing device 812, for interacting with a computer user and providing information to the processor 803. The pointing device 812, for example, may be a mouse, a trackball, track pad, touch screen, or a pointing stick for communicating direction information and command selections to the processor 803 and for controlling cursor movement on the display 810. In addition, a printer may provide printed listings of data stored and/or generated by the computer system 801.

The computer system 801 performs a portion or all of the processing steps of the invention in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 801, for driving a device or devices for implementing the invention, and for enabling the computer system 801 to interact with a human user (e.g., wireless network administration personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local are network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computer system 801 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 801 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA) laptop computer, or cellular telephone.

To summarize, presented herein are mechanisms to define a new LAA-LTE header structure that can be transmitted on the LAA-LTE unlicensed carrier leg to make use of otherwise wasted wait time when an LAA-LTE device reserves the channel and is waiting for a 1 millisecond subframe transmission boundary. The new LAA-LTE header also assists in setting the LAA-LTE LBT parameters (i.e., courtesy parameters) to provide appropriate fairness with cross-technology devices (e.g., Wi-Fi transmitters). The techniques presented herein also provide control information to assist LAA-LTE user equipment in synchronizing to the unlicensed LAA-LTE component carrier. Additionally, the wireless device can indicate the presence of user data in the gap interval between the LAA-LTE header and 1 millisecond subframe transmission boundary. The inclusion of user data in the gap interval may be determined adaptively depending on the size of the gap interval.

These techniques allow the shared medium to be utilized more efficiently, which is particularly important when the transmission bursts may be relatively short, as is required in Japanese regulation. Additionally, the techniques presented allow a self-organized mechanism whereby fairness among wireless transmitters may be adapted autonomously without the need to manually change parameters for different deployment scenarios.

In one form, a method is provided for self-organizing fair access to a shared spectrum of a wireless system. The method comprises, at a wireless device, determining a success index representing a measure of success in transmitting wireless transmission in a shared spectrum. The wireless device is configured to transmit wireless transmissions in a plurality of subframes over a shared spectrum, each of the subframes bounded by subframe boundaries at predetermined time intervals. The wireless device performs a clear channel assessment to determine whether the shared spectrum is available at the end of the clear channel assessment time interval. The wireless device determines a gap interval between the end of the clear channel assessment time interval and the next subframe boundary and transmits the success index during the gap interval.

In another form, an apparatus is provided comprising a transmitter, a receiver, a modem, and a processor. The transmitter is configured to transmit wireless transmissions in a plurality of subframes over a shared spectrum. Each of the subframes is bounded by subframe boundaries at predetermined time intervals. The receiver is configured to receive signals in the shared spectrum. The modem is configured to modulate signals to be transmitted and demodulate received signals. The processor is configured to determine a success index representing a measure of success in transmitting the wireless transmissions. The processor is further configured to perform a clear channel assessment to determine whether the shared spectrum is available at the end of the clear channel assessment time interval. The processor is configured to determine a gap interval between the end of the clear channel assessment time interval and the next subframe boundary. The processor is also configured to cause the transmitter to transmit the success index during the gap interval.

In yet another form, a method is provided for adjusting parameters in a wireless device to allow for fair access to a shared wireless medium. The method comprises, at a first wireless device among a plurality of wireless devices, receiving at least one success index associated with at least one second wireless device among the plurality of wireless devices. The wireless devices are configured to transmit wireless transmission in a plurality of subframes over a shared spectrum. The at least one success index is received during a gap interval between a clear channel assessment interval of the at least one second wireless device and the next subframe boundary. The first wireless device adjusts one or more parameters based on the at least one success index associated with the at least one second wireless device. The first wireless device transmits a wireless transmission over the shared spectrum in accordance with the one or more parameters. The adjusted parameters cause the first wireless device to share the shared spectrum fairly with the at least one second wireless device.

In still another form, an apparatus is provided comprising a transmitter, a receiver, a modem, and a processor. The transmitter is configured to transmit wireless transmissions in a plurality of subframes over a shared spectrum. Each of the subframes is bounded by subframe boundaries at predetermined time intervals. The receiver is configured to receive signals in the shared spectrum. The modem is configured to modulate signals to be transmitted and demodulate received signals. The processor is configured to receive at least one success index via the receiver. The at least one success index is associated with at least one second wireless device among a plurality of wireless devices. The at least one success index is received during a gap interval between a clear channel assessment interval of the at least one second wireless device and the next subframe boundary. The processor is configured to adjust one or more parameters based on the at least one success index associated with the at least one second wireless device. The processor is further configured to cause the transmitter to transmit a wireless transmission over the shared spectrum in accordance with the one or more parameters. The adjusted parameters cause the apparatus to share the shared spectrum fairly with the at least one second wireless device.

In a further form, a system is provided comprising a plurality of wireless devices configured to transmit wireless transmissions in a plurality of subframes over a shared spectrum. Each wireless device in configured to determine its respective success index representing a measure of success in transmitting wireless transmissions over the shared spectrum. Each wireless device is further configured to perform a clear channel assessment before transmitting in the shared spectrum and transmit its respective success index in a gap interval between the end of the clear channel assessment interval and the next subframe boundary. Each wireless device is also configured to receive the success indices from the remainder of the plurality of wireless devices and adjust parameters based on the received success indices. Each wireless device in the plurality of wireless devices is configured to fairly share the shared spectrum by adjusting its respective parameters based on the received success indices.

The above description is intended by way of example only. In particular, the techniques presented herein and described with respect to LAA-LTE devices and transmissions may also be used with respect to any type of LTE devices and transmissions that use unlicensed wireless spectrum, and are not intended to be limited to LAA-LTE implementations.

What is claimed is:

1. A method comprising:
at a wireless device configured to transmit wireless transmissions in a plurality of subframes over a shared spectrum, determining a success index representing a measure of success in transmitting the wireless transmissions, wherein the plurality of subframes are each bounded by subframe boundaries at predetermined time intervals;
performing a clear channel assessment to determine whether the shared spectrum is available at an end of a clear channel assessment time interval;
determining a gap interval between the end of the clear channel assessment time interval and a next subframe boundary; and
transmitting the success index during the gap interval.

2. The method of claim 1, further comprising transmitting control signals during the gap interval.

3. The method of claim 2, wherein the control signals include one or more of a synchronization signal, an automatic gain control signal, a channel estimation signal, or a cell identification signal.

4. The method of claim 2, further comprising transmitting user data along with the control signals in a subframe after the gap interval, wherein the control signals are transmitted without user data during the gap interval.

5. The method of claim 1, further comprising:
determining whether the gap interval is longer than a predetermined time interval; and
responsive to a determination that the gap period is longer than the predetermined time interval, transmitting control signals or user data during the gap interval.

6. The method of claim 1, further comprising generating the success index based on one or more of a buffer occupancy, Request-To-Send/Clear-To-Send (RTS/CTS) transmissions, or a ratio between a served cell throughput and an offered cell load.

7. An apparatus comprising:
a transmitter configured to transmit wireless transmissions in a plurality of subframes over a shared spectrum, the plurality of subframes bounded by subframe boundaries at predetermined time intervals;
a receiver configured to receive wireless signals in the shared spectrum;
a modem configured to modulate signals to be transmitted and demodulate received signals;
a processor configured to:
determine a success index representing a measure of success in transmitting the wireless transmissions;
perform a clear channel assessment to determine whether the shared spectrum is available at an end of a clear channel assessment time interval;
determine a gap interval between the end of the clear channel assessment time interval and a next subframe boundary; and
cause the transmitter to transmit the success index during the gap interval.

8. The apparatus of claim 7, wherein the processor is further configured to cause the transmitter to transmit control signals during the gap interval.

9. The apparatus of claim 8, wherein the control signals include one or more of a synchronization signal, an automatic gain control signal, a channel estimation signal, or a cell identification signal.

10. The apparatus of claim 8, wherein the processor is further configured to cause the transmitter to transmit user data along with the control signals in a subframe after the gap interval, wherein the transmitter transmits the control signals without user data during the gap interval.

11. The apparatus of claim 7, wherein the processor is further configured to, responsive to a determination that the gap interval is longer than a predetermined time interval, cause the transmitter to transmit control signals or user data during the gap interval.

12. The apparatus of claim 7, wherein the processor is further configured to generate the success index based on one or more of a buffer occupancy, Request-To-Send/Clear-To-Send (RTS/CTS) transmissions, or a ratio between a served cell throughput and an offered cell load.

13. A method comprising:
at a first wireless device among a plurality of wireless devices configured to transmit wireless transmissions in a plurality of subframes over a shared spectrum, receiving at least one success index associated with at least one second wireless device among the plurality of wireless devices, wherein the at least one success index is received during a gap interval between a clear channel assessment interval of the at least one second wireless device and a next subframe boundary;
adjusting one or more parameters based on the at least one success index associated with the at least one second wireless device; and
transmitting a wireless transmission over the shared spectrum in accordance with the one or more parameters, wherein the one or more parameters cause the first wireless device to share the shared spectrum fairly with the at least one second wireless device.

14. The method of claim 13, wherein the one or more parameters include one or more of a clear channel assessment interval duration, an extended clear channel assessment interval duration, a back-off parameter, a maximum length of the wireless transmission, an energy sensing threshold, a defer time interval, a minimum contention window size, or a maximum contention window size.

15. The method of claim 13, wherein the at least one success index comprises a plurality of success indices, and further comprising:
aggregating the plurality of success indices over a predetermined period of time to produce an average success index;
comparing the average success index to a predetermined threshold; and
responsive to the average success index being less than the predetermined threshold, adjusting the one or more courtesy parameters to cause the first wireless device to be less aggressive in transmitting over the shared spectrum.

16. The method of claim 15, wherein the predetermined threshold for the average success index is a success index calculated for the first wireless device.

17. The method of claim 13, further comprising:
computing an estimated legacy success index for at least one third wireless device configured to access the shared spectrum, the at least one third wireless device configured to transmit wireless transmissions over the shared spectrum without transmitting an indication of success; and
adjusting the one or more parameters based on the estimated legacy success index.

18. The method of claim 17, wherein the plurality of wireless devices transmit in accordance with a Licensed Assisted Access Long Term Evolution (LAA-LTE) communication standard, and wherein the at least one third wireless device transmits in an IEEE 802.11 communication standard.

19. The method of claim 18, wherein computing the estimated legacy success index is based on a number of Request-To-Send (RTS) and Clear-To-Send (CTS) messages detected from the at least one third wireless device.

20. The method of claim 13, further comprising receiving from a centralized entity adjustment values to adjust the one or more parameters to cause fair access by the first wireless device to the shared spectrum.

* * * * *